May 31, 1949.  J. R. PARKS ET AL  2,471,771
CORN PICKER GATHERING SHOE
Filed Dec. 8, 1947  2 Sheets-Sheet 1
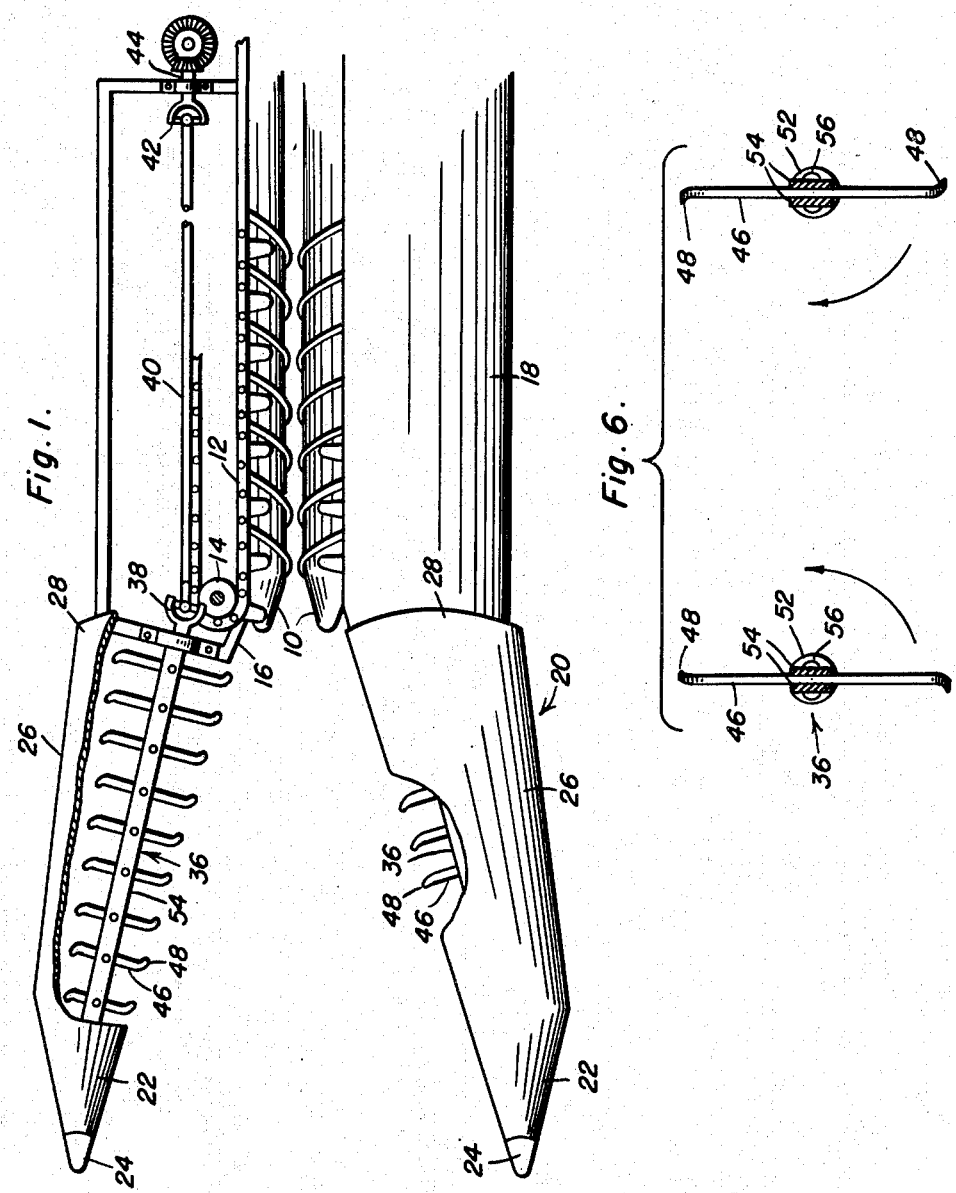
John R. Parks
Henry Hielen
INVENTORS May 31, 1949.                J. R. PARKS ET AL                2,471,771
                         CORN PICKER GATHERING SHOE
Filed Dec. 8, 1947                                          2 Sheets-Sheet 2
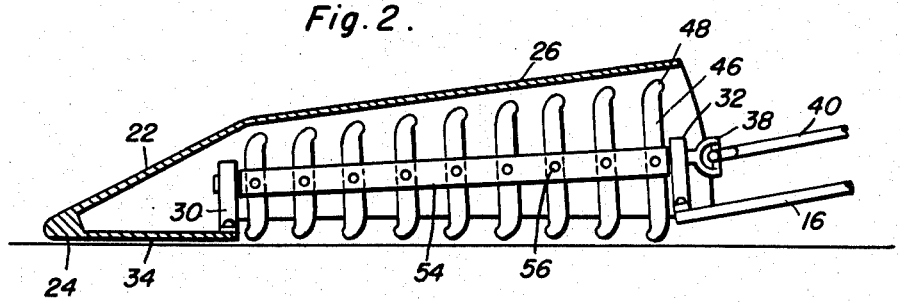
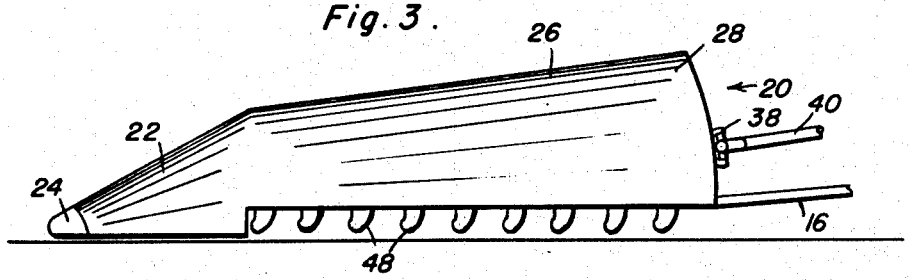
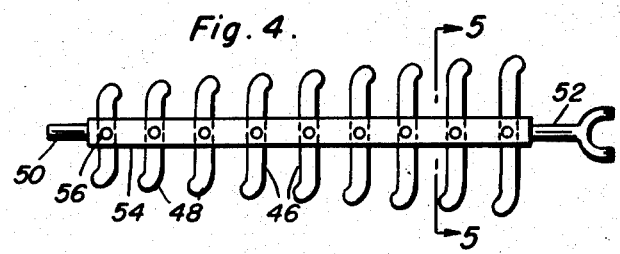
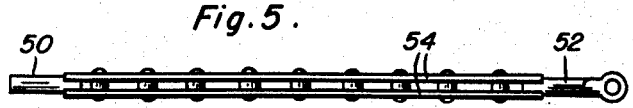
John R. Parks
Henry Hielen
        INVENTORS Patented May 31, 1949

2,471,771

UNITED STATES PATENT OFFICE 2,471,771

CORN PICKER GATHERING SHOE

John R. Parks and Henry Hielen, Giltner, Nebr.

Application December 8, 1947, Serial No. 790,406

3 Claims. (Cl. 56—119)

This invention relates generally to corn pickers, and more particularly to improvements in pointed corn gathering shoes carried on the front end of the corn picker and adapted to straddle the row of corn being picked.

A primary object of this invention is to provide improvements in corn gathering shoes on corn pickers, whereby loose ears of corn lying on the ground between rows will be harvested by the corn picker, the improved means described herein serving to impel the said ears toward the center of the row where the ears are fed into the conveyor means normally provided on corn pickers.

Another object of this invention is to provide means of the character mentioned in the preceding object which will function properly with regard to the said loose ears of corn, without becoming fouled by stalks of corn, stones or other matter encountered during the operation of the machine, this feature being accomplished in part by provision of teeth which are curved at the outer end, in part by making these teeth individually pivotally deflectible to avoid such objects as stones, and in part by partially enclosing the rotating shaft and teeth employed in the device.

Still another object of this invention is to provide an improved means of the character described which may be combined with many types of corn pickers of conventional design, without undue modification of these conventional pickers.

And another object of this invention, ancillary to all the other objects thereof, is to provide means whereby ears of corn otherwise lost are harvested, and in this connection it should be noted that the instant invention is developed with a view to preventing the forcing of loose ears of corn into the ground as is done by corn pickers developed heretofore, the instant invention being adapted to lift the loose ears of corn toward the center line of the row of corn being picked.

And the last object to be mentioned specifically is to provide means of the type mentioned which is relatively inexpensive and practicable to manufacture, extremely simple to install and to operate, which is safe to use, and which will give generally efficient and durable service.

With these objects definitely in view together with other objects which will appear hereinafter as the description proceeds, this invention resides in certain novel features of construction, combination and arrangement of parts and portions as will be hereinafter described in the specification, particularly pointed out in the appended claims, and illustrated in the accompanying drawings which form a material part of this application, and in which:

Figure 1 is a top plan view of this invention operatively applied to the fore part of a corn picker, certain portions being broken away and the underlying portions shown in plan, to illustrate the general arrangement of the elements of this invention;

Figure 2 is a longitudinal vertical sectional view of one of the parts hereinafter referred to as a shoe with a shaft carrying teeth operatively mounted and illustrated in elevation, the view being taken substantially on the longitudinal center line of one of these shoes;

Figure 3 is a side elevational view of the structure illustrated in Figure 2;

Figure 4 is a side elevational view of the above mentioned shaft and teeth mounted thereon;

Figure 5 is another side elevational view of the structure shown in Figure 4 turned through 90 degrees about a longitudinal axis; and Figure 6 is an enlarged grouped view of a pair of shafts with teeth mounted thereon, the view being designed to illustrate the details of mounting of the teeth and a preferred curved form thereof, the arrows in the figure indicating the direction of rotation of the two shafts.

Similar characters of reference designate similar or identical parts and portions throughout the specification and throughout the several views of the drawings.

Referring now to the drawings in detail, the environment with which this invention is adapted to be used includes a corn picker of conventional design which will ordinarily include a pair of pointed rotary snapping rolls 10, conveyor chains, one of which is illustrated fragmentarily in Figure 1 at 12, guided at the lower end thereof by rollers, one of which is illustrated at 14 and parallel frame members 16 which support parallel sheaths 18. The structure illustrated is, of course, varied in different corn pickers and the details of this structure are immaterial in this application, except in relation and combination with the structure hereinafter disclosed as cooperating therewith.

This invention proposes to provide a pair of shoes, generally indicated by the numeral 20, each shoe having what will be considered a forward pointed end 22 and a solid tip 24 and a larger and longer rear portion 26, the pointed end 22 and the rear portion 26 being both constructed of sheet metal and preferably integral. These shoes are, of course, hollow and are open on one side, the open sides being adjacent when the device is assembled.

The heel portions 28 at the extreme rear of each shoe, in a simple form illustrated in the drawings, are welded to the forward end portions of the sheaths 18, or to some other adjacent fixed portion of the corn picker such as the structure illustrated at 16.

The portions 22 and 26 are each conoidal and the rear ends of each have bearings 30 and 32 mounted therein. The forwardly disposed bearing 30 is mounted directly upon the rear edge portion of a flattened base portion 34, while the rearwardly disposed bearing 32 may be mounted on the forward end of the structure indicated at 16. The bearings support a pair of shafts 36 arranged substantially upon the longitudinal axis of the portion 26 and a universal joint 38 will ordinarily be required on the rear end of this shaft 36 for connection to suitable drive means which may include another link shaft 40 and universal joint 42 for connection to a drive shaft 44 operatively driven by power means provided in the corn picker for actuation of the conveyor chains 12, the rotary cutters 10 and the like. It should be stressed, however, that the particular power transmission means whereby the shafts 36 are rotated is considered a matter of mechanical expediency and individual preferment and is not material in this application.

Each of the shafts 36 carry a plurality of regularly spaced teeth 46 which are curved, as at 48, near the outer ends thereof, and which are pivotally secured to the shaft 36.

Each of the shafts comprises terminal journal portions 50 and 52 and a pair of parallel spaced strap members 54, the strap members being preferably welded to the journal portions 50 and 52. The teeth are of graduated lengths with the shorter teeth being disposed toward the front end of the shafts 36 and pivot pins or rivets 56 are inserted through bores in the strap members 54 and in central portions of the teeth 46, so that these teeth are made to rotate with the shaft 36 but are free to pivot within limits on the pivot pins 56, in order that these teeth may avoid obstructions such as rocks encountered during the operation of the machine.

The operation of this invention will be clearly understood from the foregoing description of the mechanical details thereof, taken in connection with the above recitation of the objects sought to be achieved by this invention. In recapitulation, it need only be added that the teeth 46 tend to remain normal to the shaft 36 when the said shaft is rotated rapidly, due to centrifugal force acting upon the teeth. It will be clear that as the corn picker is propelled along a row of corn, the teeth 46 will strike any ears of corn lying on the ground on either side of the row of corn being operated upon. In this connection it should be carefully noted that the shoes and the structure carried thereby are inclined slightly downwardly as well as outwardly toward the front of the machine, so that loose ears of corn will be picked up and thrown toward the center line of a row, when the machine is used to harvest corn in rows which are more or less hilled up or elevated above the level of the ground disposed immediately laterally of the center line of the row.

Obviously, many minor variations may be made in the details of construction and proportionment of the various elements of this invention and the drawings and specification should be thought of as illustrative rather than limiting. To increase the effect of centrifugal action on the teeth, the same may be made slightly heavier on one end than in the other, this feature being indiscernible in the drawings.

Having described the invention, what is claimed as new is:

1. In a corn picker having conveyor means and actuating means for motivating parts of the picker, a pair of pointed corn gathering shoes carried on a corn picker in front of said conveyor means and adapted to straddle a row, a shaft longitudinally and rotatively mounted in each of said shoes, teeth carried by said shafts and spaced therealong, and connecting means for operatively connecting said shafts to said actuating means, said shoes being disposed at an acute angle with the direction of travel of the shoes in operation, and said teeth being mounted on said shafts and pivoted on axes normal to the axes of the shafts.

2. A device according to claim 1, and wherein said teeth are individually mounted at their centers on said shafts so as to extend substantially transversely of the shafts.

3. A device according to claim 2, and wherein said teeth are of graduated lengths with the shorter teeth disposed toward the forward end of the shoes.

JOHN R. PARKS.
HENRY HIELEN.

REFERENCES CITED

The following references are of record in the file of this patent:

UNITED STATES PATENTS

| Number | Name | Date |
|---|---|---|
| 675,174 | Still | May 28, 1901 |
| 1,734,972 | Johnson | Nov. 12, 1929 |
| 1,838,498 | Pospishil | Dec. 29, 1931 |
| 2,182,772 | Nightenhelser et al. | Dec. 5, 1939 |